(12) United States Patent
Holzapfel et al.

(10) Patent No.: US 9,200,927 B2
(45) Date of Patent: Dec. 1, 2015

(54) POSITION-MEASURING DEVICE

(71) Applicant: DR. JOHANNES HEIDENHAIN GmbH, Traunreut (DE)

(72) Inventors: Wolfgang Holzapfel, Obing (DE); Michael Hermann, Tacherting (DE); Karsten Saendig, Palling (DE)

(73) Assignee: DR. JOHANNES HEIDENHAIN GMBH, Traunreut (DE)

( * ) Notice: Subject to any disclaimer, the term of this patent is extended or adjusted under 35 U.S.C. 154(b) by 200 days.

(21) Appl. No.: 14/093,552

(22) Filed: Dec. 2, 2013

(65) Prior Publication Data

US 2014/0151540 A1 Jun. 5, 2014

(30) Foreign Application Priority Data

Dec. 3, 2012 (DE) .......................... 10 2012 222 077

(51) Int. Cl.
*G01D 5/347* (2006.01)
*G01D 5/38* (2006.01)

(52) U.S. Cl.
CPC ................ *G01D 5/3473* (2013.01); *G01D 5/38* (2013.01); *G01D 5/34715* (2013.01)

(58) Field of Classification Search
CPC ....... G01D 5/34; G01D 5/347; G01D 5/3473; G01D 5/34715; G01D 5/36; G01D 5/38
USPC ...................... 250/231.13–231.18; 341/9–14; 356/616–617
See application file for complete search history.

(56) References Cited

U.S. PATENT DOCUMENTS

| 7,385,179 B2* | 6/2008 | Igaki et al. ............... 250/231.14 |
| 7,589,314 B2* | 9/2009 | Oka et al. ................. 250/231.13 |
| 8,415,610 B2* | 4/2013 | Nakajima et al. ........ 250/231.13 |
| 2007/0187581 A1 | 8/2007 | Ohmura et al. | |

FOREIGN PATENT DOCUMENTS

| EP | 1760435 A2 | 3/2007 |
| EP | 1795872 A1 | 6/2007 |
| EP | 2570780 A2 | 3/2013 |
| WO | WO 2007129022 A1 | 11/2007 |

OTHER PUBLICATIONS

R.M. Pettigrew "Analysis of Grating Images and its Application to Displacement Metrology", SPIE vol. 136, p. 325-332 (Dec. 1977), United Kingdom.

* cited by examiner

*Primary Examiner* — Seung C Sohn
(74) *Attorney, Agent, or Firm* — Leydig, Voit & Mayer, Ltd.

(57) ABSTRACT

A position-measuring device includes a cylindrical object rotatable about a longitudinal axis and having a circumferential annular reflection measuring graduation. A stationary scanning unit is disposed opposite the cylindrical object and has a light source, a transmission grating and a detector. The scanning unit is configured to optically scan the reflection measuring graduation by beams of light emitted from the light source passing through the transmission grating and then striking the reflection measuring graduation, from where the beams of light are reflected back toward the detector, which is configured to generate rotation-dependent position signals. An optically effective perpendicular distance between the detector and the reflection measuring graduation is selected to be one of greater or less than an optically effective perpendicular distance between the transmission grating and the reflection measuring graduation depending on a radius of the cylindrical object.

14 Claims, 7 Drawing Sheets

POSITION-MEASURING DEVICE

CROSS-REFERENCE TO PRIOR APPLICATION

Priority is claimed to German Patent Application No. DE 10 2012 222 077.1, filed on Dec. 3, 2012, the entire disclosure of which is hereby incorporated by reference herein.

FIELD

The present invention relates to a position-measuring device including a cylindrical object which has a circumferential annular reflection measuring graduation and is rotatable about its longitudinal axis, and a stationary scanning unit which is disposed opposite the rotatable object and adapted to optically scan the reflection measuring graduation, and which includes a light source, a transmission grating, and a detector, the beams of light emitted by the light source passing through the transmission grating and then striking the reflection measuring graduation, from where they are reflected back toward the detector, which is capable of generating rotation-dependent position signals.

BACKGROUND

A position-measuring device having a cylindrical object and a stationary unit is known, for example, from European Patent Application EP 1 795 872 A1. FIG. 1 of EP 1 795 872 depicts a position-measuring device which includes, firstly, a cylindrical object which has a circumferential annular reflection measuring graduation and is rotatable about its longitudinal axis. Secondly, a stationary scanning unit is disposed opposite the rotatable object to optically scan the reflection measuring graduation. Suitable scanning units for such a device are shown, for example, in FIGS. 2B and 2C of EP 1 795 872 and each include a light source, a transmission grating, and a detector. The beams of light emitted by the light source pass through the transmission grating and then strike the reflection measuring graduation, from where they are reflected back toward the detector. The detector is capable of generating rotation-dependent position signals in response to relative motion between the reflection measuring graduation and the scanning unit.

The optical scanning principle used in such a position-measuring device is described in detail in the publication by R. M. Pettigrew entitled "Analysis of Grating Images and its Application to Displacement Metrology" in SPIE Vol. 136, 1st European Congress on Optics Applied to Metrology (1977), pp. 325-332. A brief description of this known scanning principle is given below:

A transmission grating is illuminated by a suitable light source such as, for example, an LED. Each illuminated line of the transmission grating emits a cylindrical wave toward the measuring standard, which is disposed at a distance u behind the transmission grating. Each of these cylindrical waves produces enlarged self-images of the measuring standard at distances v in the optical path. The periodicity $d_D$ of the self-images in a detection plane is given as follows:

$$d_D = d_M\left(1 + \frac{v}{u}\right) \quad \text{(equation 1)}$$

$d_D$=periodicity of the self-images of the measuring standard in a detection plane of the detector
$d_M$=periodicity of the measuring standard
u=distance between the transmission grating and the measuring standard
v=distance between the measuring standard and the detection plane By suitably selecting the periodicity $d_S$ of the transmission grating according to following equation 2, it is achieved that the self-images add up constructively incoherently on the detector.

$$d_S = d_M\left(1 + \frac{u}{v}\right) \quad \text{(equation 2)}$$

$d_S$=periodicity of the transmission grating
$d_M$=periodicity of the measuring standard
u=distance between the transmission grating and the measuring standard
v=distance between the measuring standard and the detection plane In the event that the measuring standard moves relative to the other components, the self-image of the measuring standard in the detection plane moves as well. If the detector is designed as a so-called structured photodetector, whose periodicity corresponds to that of the self-image of the measuring standard, then the detector can generate displacement-dependent position signals in the form of phase-shifted incremental signals. Moreover, for optimum contrast of the self-images of the measuring standard, it turns out to be advantageous if, in addition, the following condition (also known as "Talbot condition") is met:

$$\frac{\lambda}{nd_M^2} = \frac{1}{u} + \frac{1}{v} \quad \text{(equation 3)}$$

$d_M$=periodicity of the measuring standard
u=distance between the transmission grating and the measuring standard
v=distance between the measuring standard and the detection plane
n=1, 2, 3, . . . .

This scanning principle can be used particularly advantageously in reflected-light systems, where the measuring standard is designed as a reflection measuring graduation, and where the transmission grating and the detector are arranged in a common plane. In this case, the following holds:

$$u = v \quad \text{(equation 4)}$$

u=distance between the transmission grating and the measuring standard
v=distance between the measuring standard and the detection plane From equation 1, it follows that a change in the scanning distance (i.e., in a reflected-light system, distance u and v, respectively) will not cause a change in the periodicity $d_D$ of the self-images of the measuring standard, and therefore there will be no drop in the degree of modulation of the position signals.

These considerations apply strictly only to plane measuring standards. If the scanning principle described is to be used in position-measuring devices having curved measuring standards such as, for example, circumferential annular reflection measuring graduations, then it is not a priori guaranteed that the periodicity $d_D$ of the self-images of the measuring standard; i.e., the periodicity of the interference fringe pattern in the detection plane, does not change in response to a change in the scanning distance. The above-referenced European Patent Application EP 1 795 872 A1 does not contain any information on how to achieve in such position-measuring devices that the period of the fringe pattern in the detection plane is independent of the scanning distance.

SUMMARY

In an embodiment, the present invention provides a position-measuring device including a cylindrical object rotatable about a longitudinal axis and having a circumferential annular reflection measuring graduation. A stationary scanning unit is disposed opposite the cylindrical object and has a light source, a transmission grating and a detector. The scanning unit is configured to optically scan the reflection measuring graduation by beams of light emitted from the light source passing through the transmission grating and then striking the reflection measuring graduation, from where the beams of light are reflected back toward the detector, which is configured to generate rotation-dependent position signals. An optically effective perpendicular distance between the detector and the reflection measuring graduation is selected to be one of greater or less than an optically effective perpendicular distance between the transmission grating and the reflection measuring graduation depending on a radius of the cylindrical object.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1A:
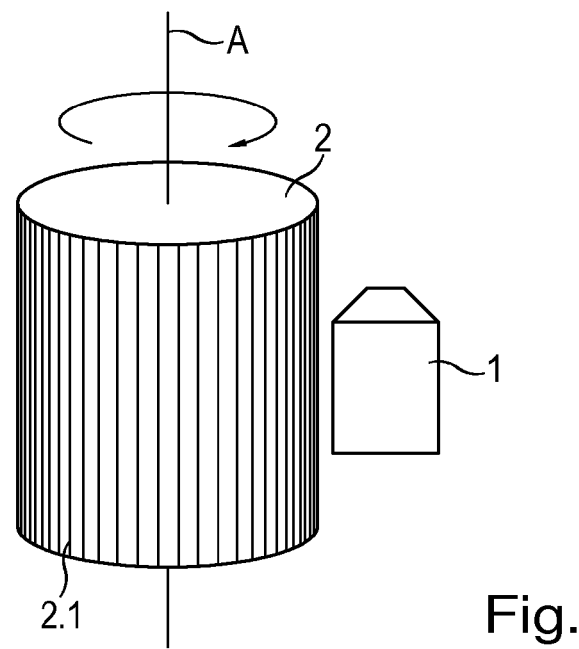
FIG. 1a is a greatly simplified three-dimensional view of a first embodiment of the position-measuring device according to the present invention.

In an embodiment, the position-measuring device of the present invention includes a cylindrical object which has a circumferential annular reflection measuring graduation and is rotatable about its longitudinal axis. Further, the position-measuring device includes a stationary scanning unit which is disposed opposite the rotatable object and adapted to optically scan the reflection measuring graduation, and which includes a light source, a transmission grating, and a detector. The beams of light emitted by the light source pass through the transmission grating and then strike the reflection measuring graduation, from where they are reflected back toward the detector, which is capable of generating rotation-dependent position signals. Depending on the radius of the cylindrical object, the optically effective perpendicular distance between the detector and the reflection measuring graduation is selected to be greater or less than the optically effective perpendicular distance between the transmission grating and the reflection measuring graduation.

Advantageously, the perpendicular distance between the transmission grating and the detector is $$\epsilon = (2 \cdot u^2)/R$$

plus a tolerance of +/−20%,
where
$\epsilon$ = perpendicular distance between the transmission grating and the detector
$u$ = optically effective perpendicular distance between the transmission grating and the reflection measuring graduation
$R$ = radius of the cylindrical object, with $R > 0$ for external scanning and $R < 0$ for internal scanning.

In an advantageous embodiment, no optical elements other than the transmission grating are disposed between the light source and the reflection measuring graduation.

The reflection measuring graduation may be designed as a grating with periodically arranged graduation regions having different optical properties, where the direction of longitudinal extension of the graduation regions is oriented parallel to or at 45° to the longitudinal direction of the object.

In this case, it may be provided that
the reflection measuring graduation includes a further grating with periodically arranged graduation regions having different optical properties, where the direction of longitudinal extension of the graduation regions is oriented perpendicular to or at 45° to the longitudinal axis of the object; and
a second scanning unit is provided for optically scanning the further grating,
so that both rotational motion of the object about its longitudinal axis and translational motion of the object along its longitudinal axis can be measured via the two scanning units.

The reflection measuring graduation may be designed either as an amplitude grating or as a phase grating.

The radial distance of the scanning unit from the longitudinal axis of the object may be selected to be greater than the radius of the cylindrical object.

Alternatively, the radial distance of the scanning unit from the longitudinal axis of the object may also be selected to be smaller than the radius of the cylindrical object.

In one possible embodiment, the light source is in the form of a spatially extended light source.

Alternatively, it may be provided that a point light source is disposed in the scanning unit in place of the light source and the transmission grating, and that the optically effective perpendicular distance between the detector and the reflection measuring graduation
is greater than the optically effective perpendicular distance between the emission area of the point light source and the reflection measuring graduation in the case of external scanning or is smaller than the optically effective perpendicular distance between the emission area of the point light source and the reflection measuring graduation in the case of internal scanning.

Further, the transmission grating may be disposed on a transparent plate-like substrate which is also located in the scanning beam path between the transmission grating and the reflection measuring graduation and between the reflection measuring graduation and the detector; the physical perpendicular distances being derived from the optically effective perpendicular distances as follows:

$$u' = u + \left(1 - \frac{1}{n_S}\right)t_S$$

$$v' = v + \left(1 - \frac{1}{n_S}\right)t_D$$

where
u=optically effective perpendicular distance between the transmission grating and the reflection measuring graduation
u'=physical perpendicular distance between the transmission grating and the reflection measuring graduation
v=optically effective perpendicular distance between the reflection measuring graduation and the detection plane D
v'=physical perpendicular distance between the reflection measuring graduation and the detection plane D
$n_S$=refractive index of the substrate
$t_S$=substrate thickness between the transmission grating and the reflection measuring graduation
$t_D$=substrate thickness between the reflection measuring graduation and the detection plane Furthermore, the transmission grating may be disposed on that side of a transparent plate-like substrate which faces the reflection measuring graduation; the physical perpendicular distance being derived from the optically effective perpendicular distance as follows:

$$v' = v + \left(1 - \frac{1}{n_S}\right)t_D$$

where
v=optically effective perpendicular distance between the reflection measuring graduation and the detection plane D
v'=physical perpendicular distance between the reflection measuring graduation and the detection plane D
$n_S$=refractive index of the substrate
$t_D$=substrate thickness between the reflection measuring graduation and the detection plane Preferably, the optically effective position of the transmission grating is closer to the longitudinal axis of the object than the optically effective position of the detector; the optically effective position of the transmission grating being determined by the optically effective perpendicular distance between the transmission grating and the reflection measuring graduation, and the optically effective position of the detector being determined by the optically effective perpendicular distance between the detector and the reflection measuring graduation.

A decisive advantage provided by the position-measuring device of the present invention is that here the period of the fringe pattern in the detection plane is independent of the scanning distance. The periodicity of the fringe pattern generated in the detection plane remains unchanged even if the scanning distance varies. As a result, the period of the fringe pattern always matches the periodicity of the detector, and therefore the scanning signals remain stable even if the scanning distance varies. Due to the suitably high mounting tolerances, this position-measuring device is easy to install.

FIG. 1a shows the position-measuring device of the present invention in a greatly simplified three-dimensional view. The position-measuring device includes, firstly, a cylindrical object 2 which is rotatable about its longitudinal axis A. A circumferential annular reflection measuring graduation 2.1 is provided on object 2 as a measuring standard. Secondly, a scanning unit 1 is disposed opposite the rotatable object 2 in stationary relationship therewith to optically scan the reflection measuring graduation 2.1, and thus to generate rotation-dependent position signals. Scanning unit 1 includes various components such as, for example, a light source, a detector, and optionally a transmission grating.

Object 2 may be, for example, a rotating machine part. The position-measuring device of the present invention transmits the generated position signals to a machine controller, which uses these signals, for example, to position object 2.

In the present exemplary embodiment, reflection measuring graduation 2.1 is designed as a grating with periodically arranged graduation regions (bright and dark in FIG. 1a) which have different optical properties. As is apparent from the figure, the direction of longitudinal extension of the graduation regions of reflection measuring graduation 2.1 is oriented parallel to the longitudinal axis A of the object. If reflection measuring graduation 2.1 is designed as an amplitude grating, the bright and dark graduation regions have, for instance, different reflective properties. However, the reflection measuring graduation may also be designed as a phase grating, in which the different graduation regions have a different phase-shifting effect on the light beams impinging thereon.

Reflection measuring graduation 2.1 may be disposed on a carrier body which, in turn, is attached to object 2 in a suitable way. In accordance with the present invention, reflection measuring graduation 2.1 may alternatively also be provided directly on the surface of object 2.

Figure 1B:
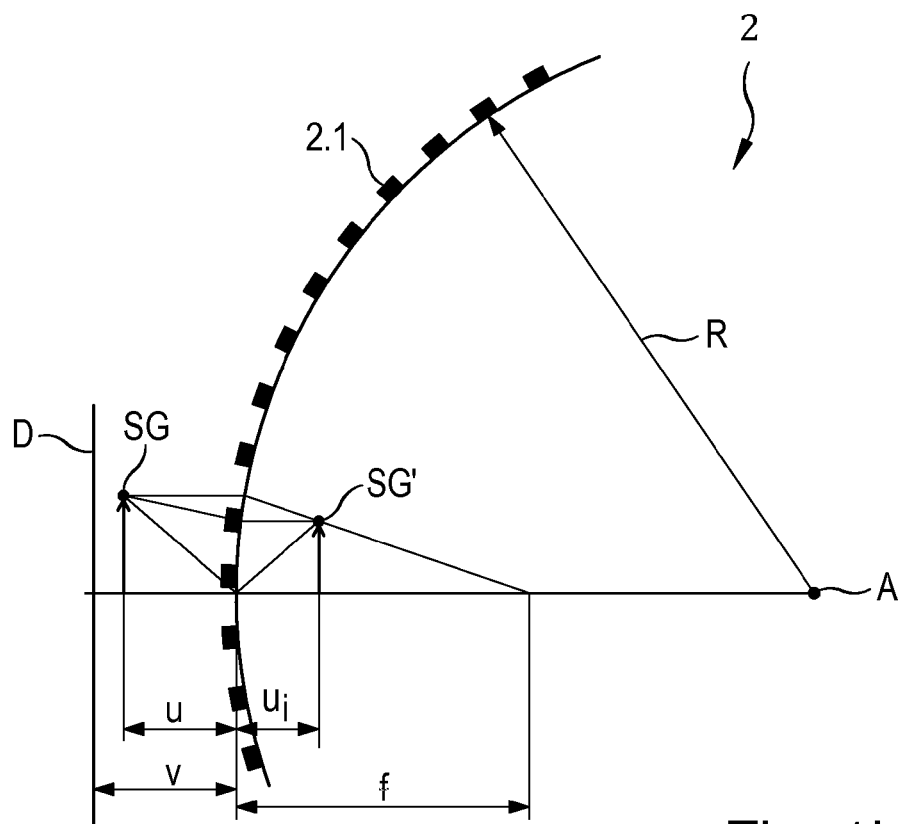
FIG. 1b is an enlarged view showing a portion of FIG. 1a and illustrating the imaging of the transmission grating in the position-measuring device of the present invention.

For further clarification of the geometrical relationships, reference is now made to FIG. 1b, which shows an enlarged sectional view of the position-measuring device of FIG. 1a, showing the reflection measuring graduation 2.1 provided thereon, as well as the imaging beam path for a transmission grating slit SG.

In such an imaging arrangement, the curved surface of cylindrical object 2 acts like a convex mirror having the focal length f, where $$f = \frac{R}{2} \qquad \text{(equation 5)}$$

f=focal length of the curved object surface
R=radius of the cylindrical object

Using such an imaging arrangement, the transmission grating slits, of which only a single slit SG is shown in FIG. 1b, are imaged into the transmission grating image SG' according to the following imaging equation:

$$\frac{1}{f} = \frac{2}{R} = -\frac{1}{u} + \frac{1}{u_i} \qquad \text{(equation 6)}$$

f=focal length of the curved object surface
R=radius of the cylindrical object
u=optically effective perpendicular distance between the transmission grating and the reflection measuring graduation
$u_i$=optically effective perpendicular distance between the transmission grating image and the reflection measuring graduation The above-described equations 1-4, which are applicable for such a scanning principle with a planar reflection measuring graduation, are in principle also applicable to the present system, which has a curved or cylindrical reflection measuring graduation 2.1. However, here consideration must be given to the fact that, due to the curvature of reflection measuring graduation 2.1, the transmission grating is imaged into a virtual transmission grating image SG', which is located at an optically effective perpendicular distance $u_i$ from reflection measuring graduation 2.1. In the above-described equations 1-4, the optically effective perpendicular distance u must therefore be replaced with the perpendicular distance $u_i$ of the virtual transmission grating image SG'.

In order to ensure the desired independence of the system of variations in the scanning distance, the following considerations are based on the assumption that the transmission grating and the detector are disposed at optically effective perpendicular distances u, v from the apex of the annular reflection measuring graduation, which optically effective perpendicular distances u, v differ by an amount or perpendicular distance $\epsilon$, so that it holds that $$v = u + \epsilon \quad \text{(equation 7)}$$

u=optically effective perpendicular distance between the transmission grating and the reflection measuring graduation v=optically effective perpendicular distance between the reflection measuring graduation and the detection plane D $\epsilon$=perpendicular distance between the transmission grating and the detector It is now required that, in a first approximation, a potential change in distance will not result in a change in the magnification factor m. Magnification factor m describes the ratio of the periodicity $d_D$ of the detector or the detected fringe pattern to the periodicity $d_M$ of the reflection measuring graduation as follows:

$$m = \frac{d_D}{d_M} \quad \text{(equation 8)}$$

m=magnification factor
$d_D$=periodicity of the detector
$d_M$=periodicity of the reflection measuring graduation Magnification factor m is derived from the various distances as follows:

$$m = 1 + \frac{v}{u_i} \quad \text{(equation 9)}$$

m=magnification factor
v=optically effective perpendicular distance between the reflection measuring graduation and the detection plane D
$u_i$=optically effective perpendicular distance between the transmission grating image and the reflection measuring graduation When equation 9 is inserted into the above imaging equation 6, then magnification factor m is derived as a function of the various system parameters as follows:

$$m(u) = 1 + (u + \epsilon)\left(\frac{2}{R} + \frac{1}{u}\right) \quad \text{(equation 10)}$$

m(u)=magnification factor
u=optically effective perpendicular distance between the transmission grating and the reflection measuring graduation
$\epsilon$=perpendicular distance between the transmission grating and the detector
R=radius of the cylindrical object Magnification factor m(u) is approximately constant if the first derivative with respect to u equals zero. This is the case when the perpendicular distance $\epsilon$ between the transmission grating and the detector is selected as follows:

$$\epsilon = \frac{2u^2}{R} \quad \text{(equation 11)}$$

u=optically effective perpendicular distance between the transmission grating and the reflection measuring graduation $\epsilon$=perpendicular distance between the transmission grating and the detector R=radius of the cylindrical object Thus, if the detector or detection plane D is located at the perpendicular distance $\epsilon$ behind the plane of the transmission grating; i.e., spaced therefrom by the perpendicular distance $\epsilon$, then changes in the scanning distance result in only a minimal change in magnification factor m. In possible embodiments of the position-measuring device according to the present invention, perpendicular distance $\epsilon$ can be selected according to equation 11 plus a tolerance of +/−20%.

If reflection measuring graduation 2.1 is designed as an amplitude grating, two superimposed fringe patterns having the same periodicity are formed on the detector. These fringe patterns result from interference of the +1th and 0th orders of diffraction, or of the 0th and −1th orders of diffraction, of the reflection measuring graduation. In the above-referenced publication by R. M. Pettigrew, this case is referred to as geometric image. In order for the two fringe patterns to be superimposed in co-phasal relationship to each other and thereby produce maximum contrast, the Talbot condition must be met analogously to equation 3. Here, too, u is replaced with $u_i$ and equations 6, 7, and 11 are employed.

$$\frac{\lambda}{nd_M^2} = \frac{1}{u_i} + \frac{1}{v} = \frac{2}{R} + \frac{1}{u} + \frac{1}{u + \frac{2u^2}{R}} \quad \text{(equation 12)}$$

Here, n must be an integer greater than zero.

In practical implementations of such a position-measuring device, dimensioning considerations often start with the periodicity $d_D$ of the detector used, because it is preferred to use identical detectors for multiple object diameters R. This allows for a reduction in the initial costs required for the manufacture of the detectors. The remaining system parameters, in particular the periodicity $d_M$ of the reflection measuring graduation and the periodicity $d_S$ of the transmission grating, can be determined as described below.

Thus, when periodicity $d_M$ of the reflection measuring graduation is replaced with equations 8, 10 and 11, the following equation 13 is obtained:

$$\frac{\lambda}{nd_D^2}\left(1 + \left(u + 2\frac{u^2}{R}\right)\left(\frac{2}{R} + \frac{1}{u}\right)\right)^2 - \frac{2}{R} - \frac{1}{u} - \frac{1}{u + \frac{2u^2}{R}} = 0 \quad \text{(equation 13)}$$

$\lambda$=light wavelength
u=optically effective perpendicular distance between the transmission grating and the reflection measuring graduation
v=optically effective perpendicular distance between the reflection measuring graduation and the detection plane
$d_D$=periodicity of the detector R=radius of the cylindrical object
n=1, 2, 3, . . . .

Determination of zeros in equation 13 yields the optically effective perpendicular distance u, which can be used in equation 11 to calculate perpendicular distance ε, in equation 7 to calculate optically effective perpendicular distance v, and in equation 8 to calculate the periodicity $d_M$ of the reflection measuring graduation Finally, the periodicity $d_S$ of the transmission grating must be determined as follows:

$$d_S = \frac{u}{v} d_D \quad \text{(equation 14)}$$

$d_S$=periodicity of the transmission grating
$d_D$=periodicity of the detector
u=optically effective perpendicular distance between the transmission grating and the reflection measuring graduation
v=optically effective perpendicular distance between the reflection measuring graduation and the detection plane One possible embodiment of the position-measuring device according to the present invention may have the following system-specific parameters:
R=10 mm
$d_D$=40 μm
λ=850 nm
n=1

Using the above equations, the remaining system parameters can be obtained as follows:
u=0.714 mm
v=0.816 mm
$d_M$=17.34 μm (3624 signal periods/circumference)
$d_S$=35.00 μm A second exemplary embodiment of the position-measuring device of the present invention is shown in schematic form in FIG. 2, and includes an object 20, which is rotatable about its axis of rotation or longitudinal axis A and has a reflection measuring graduation 21 on the outer periphery thereof. Reflection measuring graduation 21 is designed as a grating with periodically arranged graduation regions having different optical properties. In accordance with the present invention, reflection measuring graduation 21 may be designed as an amplitude grating, in which the graduation regions have different reflective properties. Alternatively, the reflection measuring graduation may also be designed as a phase grating. In this case, the graduation regions have a different phase-shifting effect on the light beams impinging thereon. The direction of longitudinal extension of the graduation regions of reflection measuring graduation 21 is oriented parallel to the object's longitudinal axis A.

Further, the position-measuring device includes a scanning unit 10 containing a light source 11, a transmission grating 13, and a detector 12. In the present exemplary embodiment, light source 11 is in the form of a spatially extended light source such as, for example, an LED. Transmission grating 13 is disposed on a transparent plate-like substrate 14 and has alternating transmissive and opaque graduation regions. Detector 12 is in the form of a known structured photodetector including a plurality of photodiodes, which are located in the detection plane and interconnected in groups.

In the position-measuring device according to the present invention, no optical elements other than transmission grating 13 are disposed between light source 11 and reflection measuring graduation 21. Thus, the scanning of reflection measuring graduation 21 is done using divergent illumination.

When object 20 rotates about its longitudinal axis A, a fringe pattern, which is modulated as a function of rotation, is produced in the detection plane, detected by detector 12, and converted into a plurality of phase-shifted position signals, respectively incremental signals.

In this exemplary embodiment, the radial distance of scanning unit 10 from the object's longitudinal axis A is selected to be greater than radius R of cylindrical object 20 and, therefore, the manner in which cylindrical object 20 is scanned here is referred to as external scanning. Here, reflection measuring graduation 21 is provided on the outer surface of object 20. In this case, radius R is selected according to R>0.

In the present embodiment, in addition to the above considerations, it must also be taken into account that transmission grating 13 is disposed on a transparent plate-like substrate 14, which is consequently also located in the scanning beam path and, more specifically, between transmission grating 13 and reflection measuring graduation 21 as well as between reflection measuring graduation 21 and the detection plane of detector 12. If transmission grating 13 and the detection plane are to be disposed at the optically effective perpendicular distances u and v, respectively, from reflection measuring graduation 21 in accordance with the above equations 6-13, then the optically effective perpendicular distances u and v must be corrected to the actual distance values u' and v', respectively, which will hereinafter be referred to as physical perpendicular distances u', v'. If substrate 14 has the refractive index $n_S$ and the thickness $t_S$=$t_D$, then the optically effective perpendicular distances u and v are increased to the physical perpendicular distances u', v' to a good approximation as follows:

$$u' = u + \left(1 - \frac{1}{n_S}\right) t_S \quad \text{(equation 15.1)}$$

$$v' = v + \left(1 - \frac{1}{n_S}\right) t_D \quad \text{(equation 15.2)}$$

Figure 2:
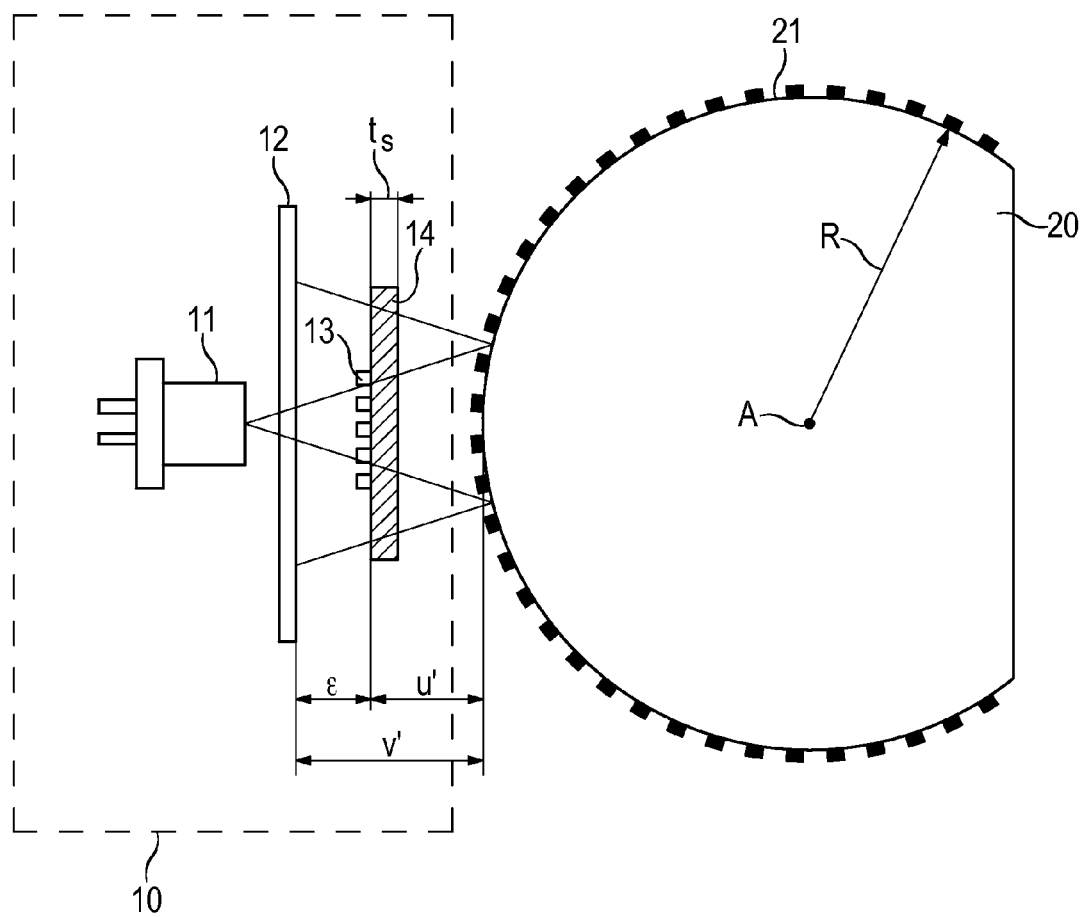
FIG. 2 is a schematic view of a second exemplary embodiment of the position-measuring device according to the present invention.

$t_S$=substrate thickness between the transmission grating and the reflection measuring graduation
$t_D$=substrate thickness between the reflection measuring graduation and the detection plane In the illustrated exemplary embodiment of the position-measuring device, as shown in FIG. 2, the physical perpendicular distance v' between detector 12 and reflection measuring graduation 21 is greater than the physical perpendicular distance u' between transmission grating 13 and reflection measuring graduation 21. Physical perpendicular distances u', v' differ by perpendicular distance ε, which was selected according to equation 11 above.

In the exemplary embodiment of FIG. 2, in which external scanning of reflection measuring graduation 21 is used and the transmitting graduation is disposed on the side facing away from reflection measuring graduation 21, the substrate-specific parameters or substrate thicknesses $t_S$=$t_D$ and $n_S$ are given as follows:
$t_S$=$t_D$=0.5 mm
$n_S$=1.51 (BK7)

Figure 3:
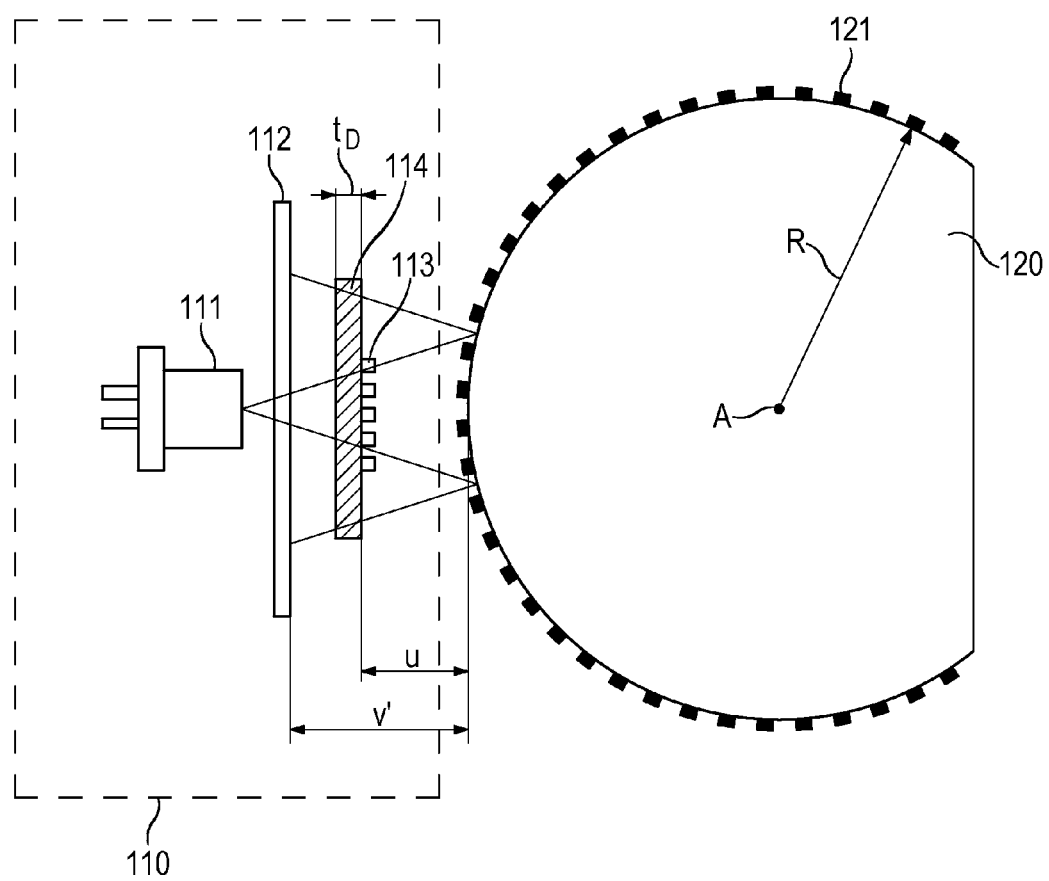
FIG. 3 is a schematic view of a third exemplary embodiment of the position-measuring device according to the present invention.

Using equations 15.1, 15.2, 13, 11, 8 and 7, physical perpendicular distances u' and v' are then obtained as follows:
u'=0.882 mm
v'=0.985 mm A third exemplary embodiment of the position-measuring device according to the present invention is shown in FIG. 3 which, again, provides for external scanning with R>0. This variant differs from the previous exemplary embodiment only in that transmission grating 113 in scanning unit 110 is now disposed on that side of plate-like substrate 114 which faces reflection measuring graduation 121. The above-mentioned substrate-specific parameters or substrate thicknesses are then $t_S=0$ and $t_D>0$, so that then only the optically effective perpendicular distance v needs to be transformed into the physical perpendicular distance v' in accordance with equation 15.2. Using the following substrate-specific parameters $t_D$ and $n_S$ as $t_D=0.15$ mm
$n_S=1.51$ (BK7)

and using equations 15.1, 15.2, 13, 11, 8 and 7, the physical perpendicular distances u' and v' are then obtained as follows:
u'=0.714 mm
v'=0.867 mm In other respects, this embodiment is similar to the aforedescribed exemplary embodiment.

Figure 4:
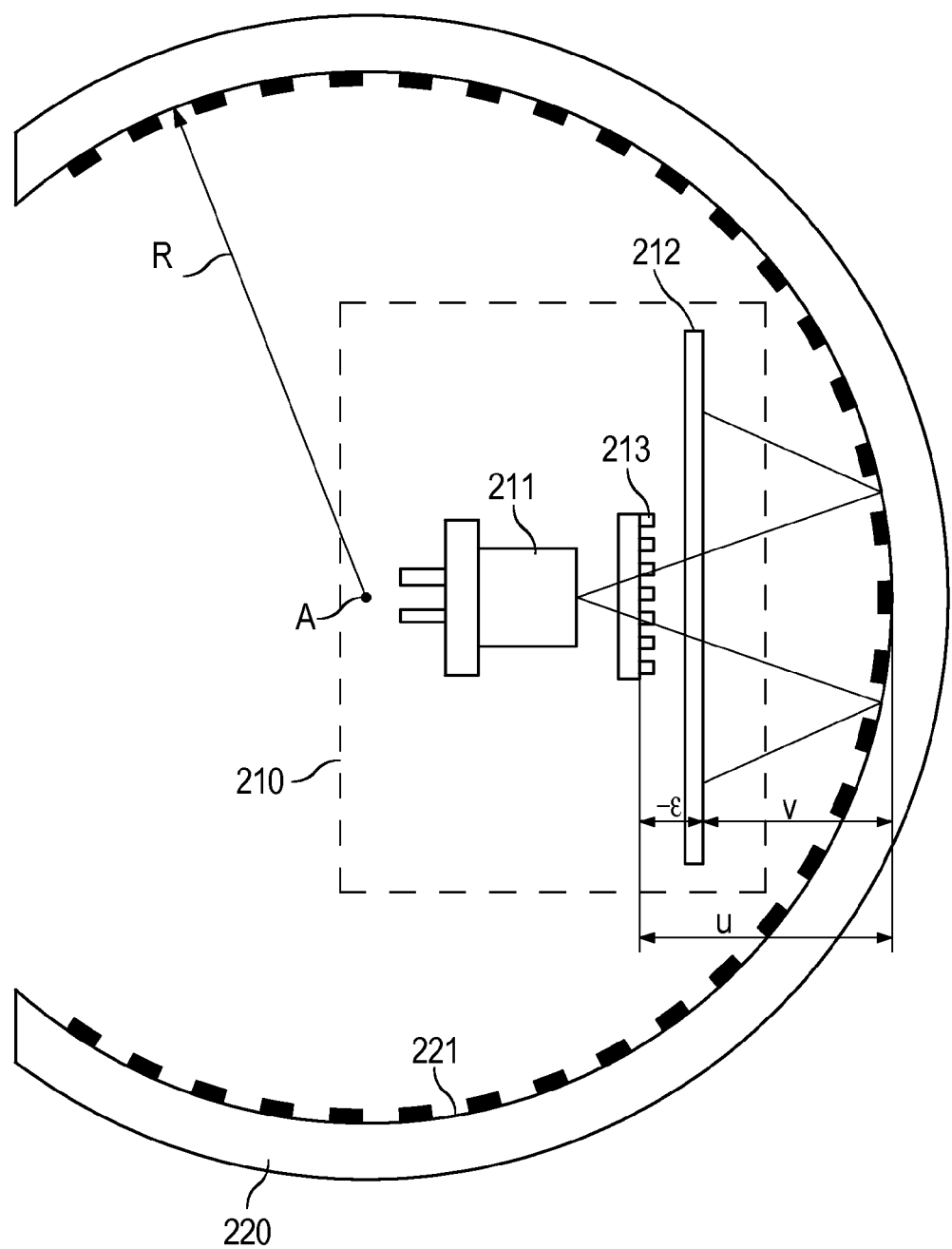
FIG. 4 is a schematic view of a fourth exemplary embodiment of the position-measuring device according to the present invention.

A fourth exemplary embodiment of the position-measuring device of the present invention is illustrated in FIG. 4. Unlike the previous embodiments, object 220 is no longer a solid cylinder, but takes the form of a cylindrical ring, which is rotatable about its object's longitudinal axis A. Reflection measuring graduation 221 is provided on the inner surface of the cylindrical ring, and the scanning unit 210 containing light source 211, transmission grating 213, and detector 212, is disposed inside the cylindrical ring. Thus, in this exemplary embodiment, reflection measuring graduation 221 is scanned from inside, which is referred to as internal scanning. This means that the radial distance of scanning unit 210 from the object's longitudinal axis A is selected to be less than radius R of cylindrical object 220. The above equations 5, 6 and 10-13 can be used in this case, too, if a correspondingly negative value is employed for radius R; i.e., for internal scanning, it holds that R<0. Equation 11 then yields also a negative value for the distance ε between transmission grating 213 and detector 212. This means, that transmission grating 213 is farther away from reflection measuring graduation 221 than the detection plane, as can be seen from FIG. 4. This embodiment is particularly advantageous when the position-measuring device according to the present invention must be mounted, for example, inside a bearing.

Thus, in the position-measuring device according to the present invention, it is provided for both external and internal scanning that the optically effective position of the transmission grating is closer to the longitudinal axis A or axis of rotation of the object than the optically effective position of the detector or the detection plane. In this connection, the optically effective position of the transmission grating is determined by the optically effective perpendicular distance u between the transmission grating and the reflection measuring graduation, while the optically effective position of the detector is determined by the optically effective perpendicular distance v between the detector and the reflection measuring graduation.

As is also apparent from FIG. 4, the plate-like substrate, on which transmission grating 213 is provided, is not in the optical paths between transmission grating 213, reflection measuring graduation 221, and detector 212. Therefore, in this embodiment, there is no need to transform the optically effective perpendicular distances u, v into physical perpendicular distances u', v'; i.e., here, it holds that u=u' and v=v'.

Figure 5:
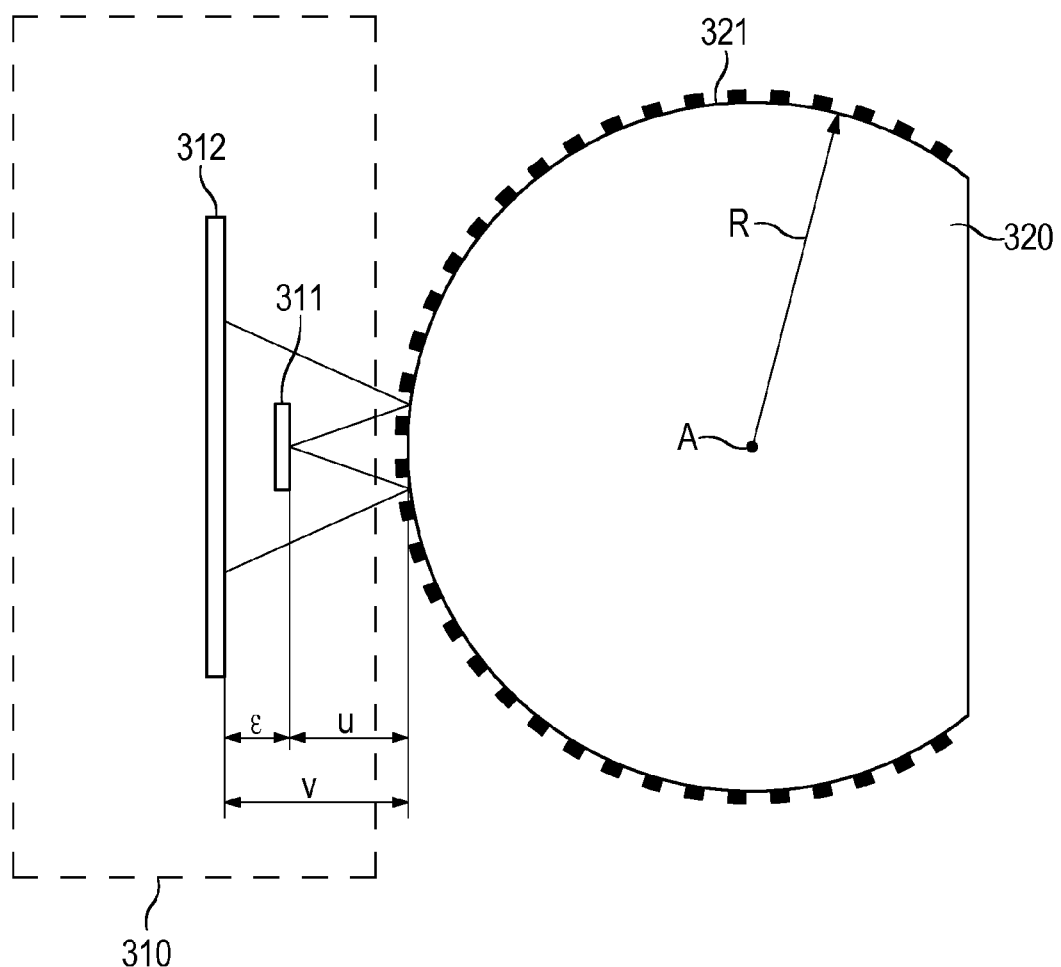
FIG. 5 is a schematic view of a fifth exemplary embodiment of the position-measuring device according to the present invention.

FIG. 5 shows in schematic form a fifth embodiment of the position-measuring device according to the present invention, in which, again, a reflection measuring graduation 321 provided on object 320 is scanned externally by a scanning unit 310, so that it holds that R>0 again. Here, scanning unit 310 includes only a light source 311 in addition to detector 312. In this variant, in place of the previously used spatially extended light sources and a transmission grating disposed in front thereof, a suitable point light source is provided as the light source 311, and the transmission grating is omitted. The selected point light source has a particularly small emission area. Examples of suitable point light sources include laser diodes or LEDs with a sufficiently small emission area. Preferably, the extent of the emission area along the measuring direction is selected to be less than or equal to half the periodicity $d_S$ of the transmission grating in accordance with equation 14. With regard to the extent of the emission area of the point light source along the measuring direction, consideration must also be given to the fact that this extent should not be equal to the periodicity $d_S$ of the transmission grating, or to an integral multiple thereof. Thus, this point light source acts like a transmission grating with only one transmitting slit.

As can be seen in FIG. 5, in the case of the illustrated external scanning with R>0, the optically effective perpendicular distance v between detector 312 and reflection measuring graduation 321 is selected to be greater than the optically effective perpendicular distance u between the emission area of point light source 311 and reflection measuring graduation 321, namely by the distance ε, which was determined according to the relationships described above.

This embodiment of the position-measuring device according to the present invention has the advantage that no transmission grating is needed.

Of course, a point light source can also be used to implement internal scanning with R<0, where the optically effective perpendicular distance between the detector and the reflection measuring graduation is less than the optically effective perpendicular distance between the emission area of the point light source and the reflection measuring graduation.

Figure 6:
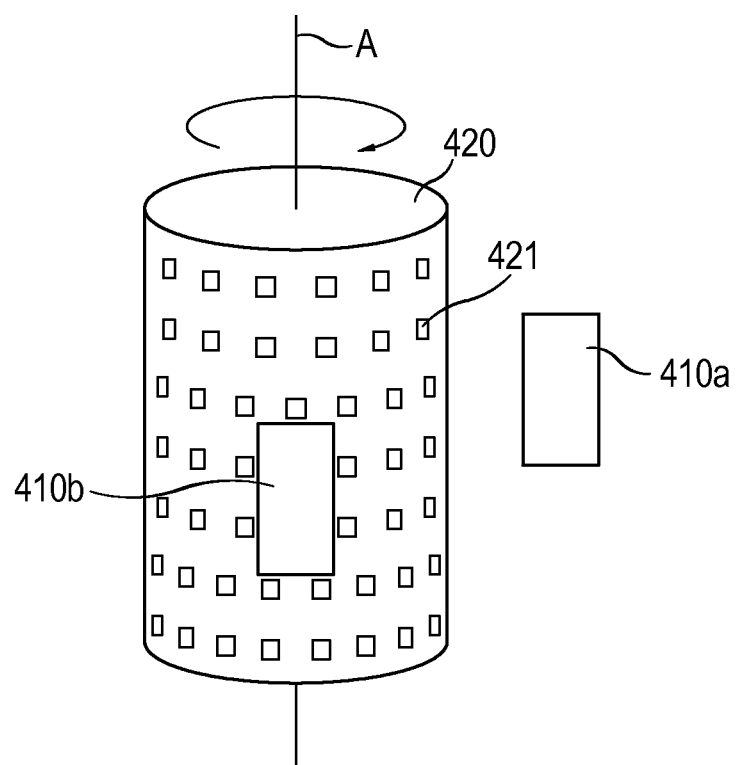
FIG. 6 is a schematic view of a sixth exemplary embodiment of the position-measuring device according to the present invention.

A sixth embodiment of the position-measuring device according to the present invention is shown in schematic form in FIG. 6. Here, the reflection measuring graduation 421 scanned is configured differently than in the previous exemplary embodiments, namely in the form of a so-called cross grating. This cross grating includes, in addition to the first grating of the exemplary embodiments discussed above, a further grating with periodically arranged graduation regions having different optical properties, where the direction of longitudinal extension of the graduation regions is oriented perpendicular to the object's longitudinal axis A. Moreover, a second scanning unit 410b is provided for optically scanning the further grating, so that both rotational motion of object 420 about its longitudinal axis A and translational motion of object 420 along its longitudinal axis can be measured via the two scanning units 410a, 410b.

Figure 7:
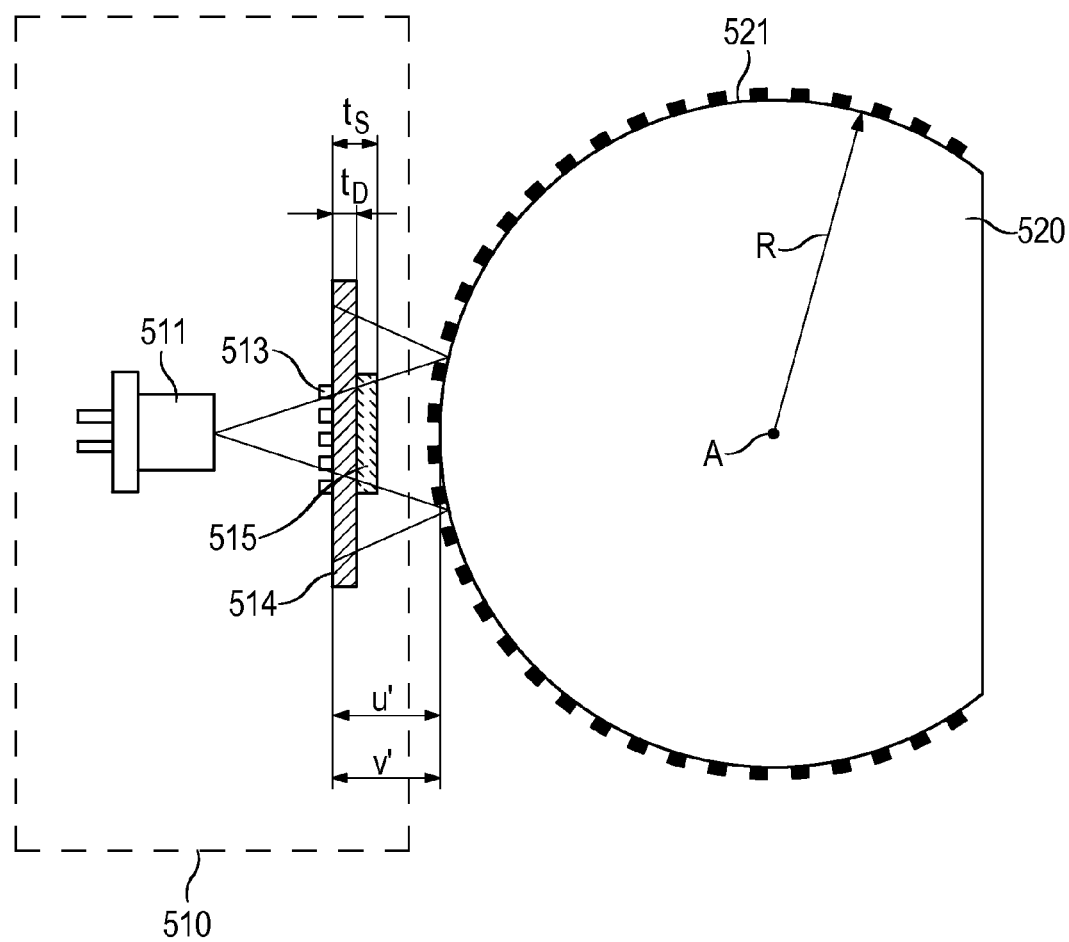
FIG. 7 is a schematic view of a seventh exemplary embodiment of the position-measuring device according to the present invention.

A seventh embodiment of the position-measuring device according the present invention is illustrated in schematic form in FIG. 7. Here, a transparent plate 515 is additionally disposed between transmission grating 513 and reflection measuring graduation 521. However, due to the limited lateral extent, transparent plate 515 is not traversed by the light beams that propagate from reflection measuring graduation 521 back to the detection plane. As a result, different substrate thicknesses $t_S$ and $t_D$ are obtained. This embodiment has the special feature that when substrate thicknesses $t_S$ and $t_D$ are suitably selected, transmission grating 513 and the detection plane are located at the same physical perpendicular distance u', v' from reflection measuring graduation 521, although the associated optically effective perpendicular distances u, v differ by the distance ε. Thus, it holds that:

$$u' = v' \quad \text{(equation 16)}$$

Equation 17, in conjunction with equations 15.1 and 15.2, yields the following condition for substrate thicknesses $t_S$ and $t_D$:

$$t_S - t_D = \frac{n_S}{n_S - 1}(v - u) \quad \text{(equation 17)}$$

In conjunction with equations 7 and 11, this yields:

$$t_S - t_D = \frac{n_S}{n_S - 1} \cdot \frac{u^2}{R} \quad \text{(equation 18)}$$

When an amplitude grating is used as the reflection measuring graduation 521, the optically effective perpendicular distance u must be determined using the additional condition according to equation 13.

The seventh embodiment of the position-measuring device according to the present invention may be advantageous in particular for an interferential variant if, as described below, gratings are required in the detection plane, which are to be formed on the same substrate as the transmission grating. This embodiment may also be used analogously for a reflection measuring graduation that is provided on the inner surface of a cylindrical ring. In this case, the transparent plate must cover the extent of the detector (not discernible in the figure), but not that of the transmission grating.

In addition to the exemplary embodiments described above, the position-measuring device according to the present invention may, of course, be embodied in various additional forms.

As mentioned earlier herein, the reflection measuring graduation may also take the form of a phase grating instead of an amplitude grating. If the phase depth of the phase grating is selected to be λ/4, then, analogously to the amplitude grating, the phase grating produces zero-th and first diffraction orders, which contribute to signal generation. In the above equations 3, 12 and 13, n would in this case have to be selected to be a half-integer; i.e., n=0.5, 1.5, 2.5, . . . .

The position-measuring device of the present invention may also be designed as a high-resolution interferential system whose reflection measuring graduation has a very small periodicity. In such an interferential system, the reflection measuring graduation is selected to be a phase grating measuring graduation with suppressed zero-order diffraction. In the above-referenced publication by R. M. Pettigrew, the fundamentals of such scanning are described as "diffraction image". What is special about this method of scanning is that the Talbot condition according to equations 3, 12 and 13 does not apply. This allows for very large distance tolerances in spite of the small periodicities of the reflection measuring graduation. In this case, the periodicity of the reflection measuring graduation is halved, so that the following equation 8' applies instead of equation 8:

$$m = \frac{2d_D}{d_M} \quad \text{(equation 8')}$$

Equations 9-11, 14 as well as 15.1 and 15.2 apply without change.

With regard to such an interferential variant of the position-measuring device according to the present invention, the specific dimensioning data of a possible exemplary embodiment are as follows: with R=10 mm, u=1 mm and 9000 graduation periods or 18000 signal periods per circumference of the reflection measuring graduation, the following values are obtained for v, $d_M$ and $d_D$:

v=1.2 mm
$d_M$=6.981 μm
$d_D$=8.517 μm

In this connection, it is problematic to produce structured photodetectors with such a small periodicity dD. This problem can be avoided if a grating whose periodicity $d_V$ is slightly different from the periodicity $d_D$ of the detector is disposed in the detection plane instead of the detector. In this case, a fringe pattern of significantly larger periodicity is produced in the detection plane of a detector located downstream of the grating. This fringe pattern can then be easily detected by a detector having a significantly larger periodicity $d_{str}$. Here, the following holds:

$$\frac{1}{d_V} = \frac{1}{d_D} \pm \frac{1}{d_{str}} \quad \text{(equation 19)}$$

$d_V$=periodicity of the additional grating in the detection plane
$d_D$=periodicity of the detector
$d_{str}$=periodicity of the structured detector Thus, in the present dimensioning example, a structured photodetector having a periodicity $d_{str}$=40 μm can be employed as the detector if a suitable grating having the periodicity $d_V$=7.022 μm is used.

In another alternative embodiment of the position-measuring device of the present invention, the reflection measuring graduation may be configured differently than in FIG. 6, namely as a cross grating whose grating directions are not axial and azimuthal, but diagonal, preferably at ±45°, to the object's longitudinal axis A. In this case, there is a radius of curvature R' greater than R along the grating directions. Therefore, the radius of curvature R' along the grating directions has to be used in place of radius R in the above formulas.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below. Additionally, statements made herein characterizing the invention refer to an embodiment of the invention and not necessarily all embodiments.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A position-measuring device comprising:
a cylindrical object rotatable about a longitudinal axis and having a circumferential annular reflection measuring graduation;
a stationary scanning unit disposed opposite the cylindrical object and having a light source, a transmission grating and a detector, the scanning unit being configured to optically scan the reflection measuring graduation by beams of light emitted from the light source passing through the transmission grating and then striking the reflection measuring graduation, from where the beams of light are reflected back toward the detector, which is configured to generate rotation-dependent position signals, wherein an optically effective perpendicular distance between the detector and the reflection measuring graduation is selected to be one of greater or less than an optically effective perpendicular distance between the transmission grating and the reflection measuring graduation depending on a radius of the cylindrical object.

2. The position-measuring device as recited in claim 1, wherein a perpendicular distance between the transmission grating and the detector is $$\epsilon = (2 \cdot u^2)/R$$

plus a tolerance of +/−20%, where
$\epsilon$ = the perpendicular distance between the transmission grating and the detector
u = the optically effective perpendicular distance between the transmission grating and the reflection measuring graduation; and
R = the radius of the cylindrical object, with R>0 for external scanning and R<0 for internal scanning.

3. The position-measuring device as recited in claim 1, wherein no optical elements other than the transmission grating are disposed between the light source and the reflection measuring graduation.

4. The position-measuring device as recited in claim 1, wherein the reflection measuring graduation includes a grating with periodically arranged graduation regions having different optical properties, a direction of longitudinal extension of the graduation regions being oriented parallel to or at 45° to the longitudinal axis of the cylindrical object.

5. The position-measuring device as recited in claim 4, wherein the reflection measuring graduation includes a further grating with periodically arranged graduation regions having different optical properties, a direction of longitudinal extension of the graduation regions of the further grating being oriented perpendicular to or at 45° to the longitudinal axis of the cylindrical object, the position-measuring device further comprising a second scanning unit configured to optically scan the further grating such that both rotational motion of the cylindrical object about the longitudinal axis and translational motion of the cylindrical object along the longitudinal axis is measurable via the two scanning units.

6. The position-measuring device as recited in claim 4, wherein the reflection measuring graduation is an amplitude grating.

7. The position-measuring device as recited in claim 4, wherein the reflection measuring graduation is a phase grating.

8. The position-measuring device as recited in claim 1, wherein a radial distance of the scanning unit from the longitudinal axis of the cylindrical object is greater than the radius of the cylindrical object.

9. The position-measuring device as recited in claim 1, wherein a radial distance of the scanning unit from the longitudinal axis of the cylindrical object is less than the radius of the cylindrical object.

10. The position-measuring device as recited in claim 1, wherein the light source is a spatially extended light source.

11. The position-measuring device as recited in claim 1, wherein a point light source is disposed in the scanning unit in place of the light source and the transmission grating, and the optically effective perpendicular distance between the detector and the reflection measuring graduation is:
greater than the optically effective perpendicular distance between an emission area of the point light source and the reflection measuring graduation in a case of external scanning; or
smaller than the optically effective perpendicular distance between the emission area of the point light source and the reflection measuring graduation in a case of internal scanning.

12. The position-measuring device as recited in claim 1, wherein the transmission grating is disposed on a transparent plate-like substrate which is also located in a scanning beam path between the transmission grating and the reflection measuring graduation and between the reflection measuring graduation and the detector, and wherein physical perpendicular distances are derived from the optically effective perpendicular distances (u, v) as follows:

$$u' = u + \left(1 - \frac{1}{n_S}\right) t_S$$

$$v' = v + \left(1 - \frac{1}{n_S}\right) t_D$$

where
u = the optically effective perpendicular distance between the transmission grating and the reflection measuring graduation
u' = physical perpendicular distance between the transmission grating and the reflection measuring graduation
v = optically effective perpendicular distance between the reflection measuring graduation and a detection plane D
v' = physical perpendicular distance between the reflection measuring graduation and the detection plane D
$n_S$ = refractive index of the substrate
$t_S$ = substrate thickness between the transmission grating and the reflection measuring graduation
$t_D$ = substrate thickness between the reflection measuring graduation and the detection plane.

13. The position-measuring device as recited in claim 1, wherein the transmission grating is disposed on a side of a transparent plate-like substrate which faces the reflection measuring graduation, and wherein a physical perpendicular distance is derived from the optically effective perpendicular distance between the detector and the reflection measuring graduation as follows:

$$v' = v + \left(1 - \frac{1}{n_S}\right) t_D$$

where
v = optically effective perpendicular distance between the reflection measuring graduation and a detection plane D
v' = physical perpendicular distance between the reflection measuring graduation and the detection plane D $n_S$=refractive index of the substrate $t_D$=substrate thickness between the reflection measuring graduation and the detection plane.

14. The position-measuring device as recited in claim 1, wherein an optically effective position of the transmission grating is closer to the longitudinal axis of the cylindrical object than an optically effective position of the detector, the optically effective position of the transmission grating being determined by the optically effective perpendicular distance between the transmission grating and the reflection measuring graduation, and the optically effective position of the detector being determined by the optically effective perpendicular distance between the detector and the reflection measuring graduation.

\* \* \* \* \*